Aug. 17, 1965 J. T. HEIER 3,200,730

LITHOGRAPHIC EXPOSURE APPARATUS AND METHOD

Filed Aug. 20, 1962 2 Sheets-Sheet 1

INVENTOR.
JAMES T. HEIER
BY
Fishburn and Gold
ATTORNEYS

LITHOGRAPHIC EXPOSURE APPARATUS AND METHOD

Filed Aug. 20, 1962

INVENTOR.
JAMES T. HEIER
BY
Fishburn and Gold
ATTORNEYS

3,200,730
LITHOGRAPHIC EXPOSURE APPARATUS AND METHOD

James T. Heier, Kansas City, Mo.
(12436 Park Lane Drive, Aurora, Colo.)

Filed Aug. 20, 1962, Ser. No. 217,868
4 Claims. (Cl. 95—73)

This invention relates to lithography, and more particularly to a contact light source for transferring or reproducing negative or positive transparencies on orthochromatic film emulsions.

In practicing this invention, ultraviolet light within particular wave length ranges is used as a light source in contact printing for transferring half-tone dots, lines or the like from a polyester base photographic transparency to a light sensitive orthochromatic emulsion in underlying contact with said transparency. This is to be distinguished from the use of ultraviolet light in exposing lithographic plates wherein vastly greater light intensities are required, and the purpose is to cause portions of the plate to vary in ink receptivity for printing purposes.

The present, and it is believed universal, practice is to use an incandescent or tungsten filament lamp as a light source when contact transferring half-tone or line negative or positive transparencies to orthochromatic emulsions. The transference permits a lithographer to alter or modify several characteristics in the transparency for obtaining a master more suitable in making lithographic plates. Such incandescent light sources have generally produced satisfactory results, however, a great deal of skill is required in obtaining proper exposure times for reproducing images exactly and when it is desired to alter densities to a significant degree the incandescent light sources tend to change in contrast and sacrifice detail. Further, the incandescent sources presently in use produce many instances where an area of very light or "ghost" dots are completely lost in the transfer and very often require a remake of the original camera positive or negative. In addition, the incandescent light sources necessitate elaborate auxiliary equipment and considerable skill on the part of the operator to alter during transference selected portions of dot structure within a negative or positive transparency by spreading or sharpening dots only in local areas. Also, the incandescent light source when used in such contact printing presents significant difficulties in the proper transferring or "holding" under-exposed or under-developed dot areas on the negative or positive.

The principal objects of the present invention are: to provide a contact light source which will easily reproduce exact duplicate negatives or positives and permit the alteration of densities without changes in contrast or sacrificing detail; to provide such a light source which will expose orthochromatic emulsions evenly and uniformly for high quality reproduction; to provide such a contact light source which when necessary will easily and effectively hold or transfer under-exposed or under-developed dot areas; to provide such a light source for use in contact printing which will produce extremely dense controlled backgrounds when desired; to provide such a source which will spread or sharpen half-tone negatives or positives either in local or entire areas as much as 25 percent; to provide such a contact light source which offers great ease of control in permitting the spreading of line negatives or positives; and to provide such a device which is simple in construction and highly reliable in use.

Other objects and advantages of this invention will become apparent from the following description taken in connection with the accompanying drawings wherein are set forth by way of illustration and example certain embodiments of this invention.

Figures 1, 6:
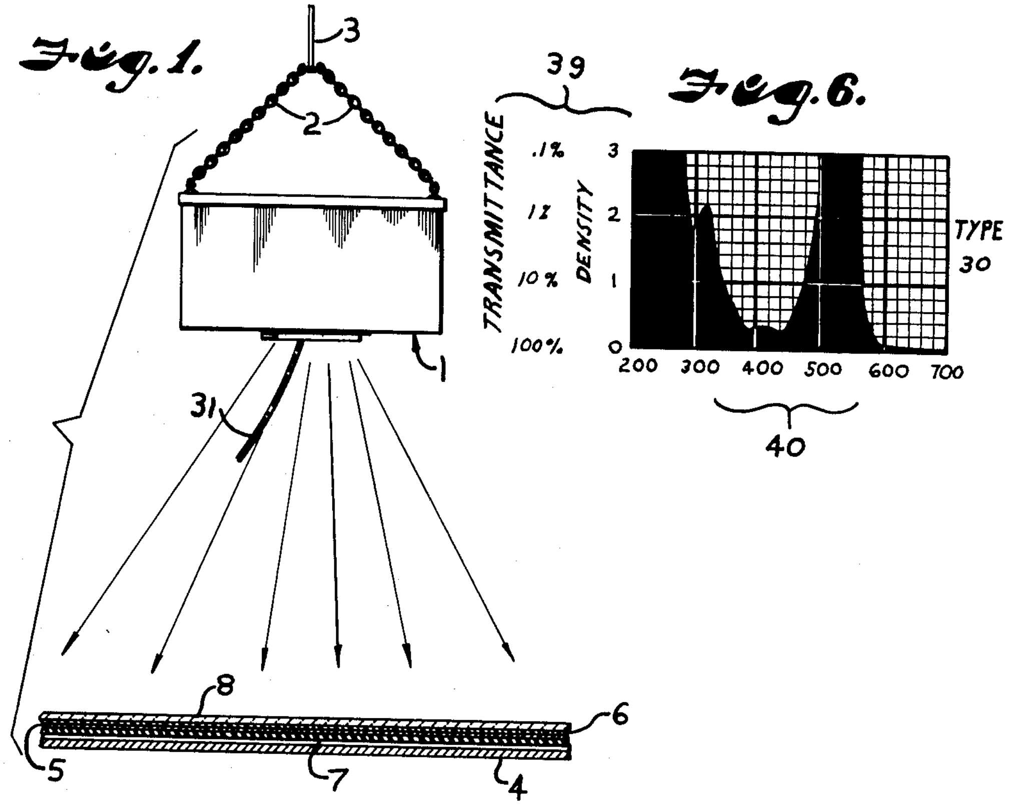
FIG. 1 is a fragmentary sectional elevational view of a light source embodying this invention in position for use with a conventional vacuum frame.
FIGS. 6, 7 and 8 are graphs showing the light wave length transmissibility of selected filters used in connection with this invention.

Referring to the drawings in more detail:

The reference numeral 1 generally indicates a light source embodying this invention. The light source 1 is illustrated (FIG. 1) suspended by suitable chains 2 and a support line 3 spaced above a conventional vacuum frame 4 for exposing orthochromatic lithographic film 5 through a positive or negative transparency 6. In the vacuum frame 4, a rubber sheet 7 is pulled upwardly in the usual manner against a glass sheet 8 by the vacuum contained within the frame for urging the transparency 6 tightly against the emulsion side of the orthochromatic film 5.

Figure 2:
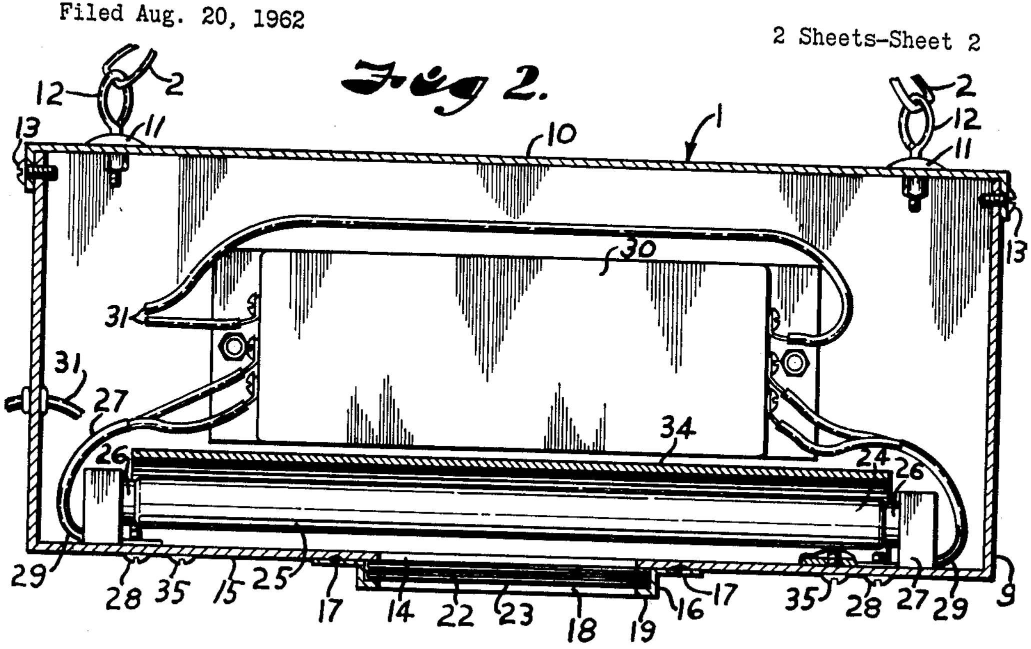
FIG. 2 is a cross-sectional view through the light source on an enlarged scale showing details of construction.

Referring particularly to FIG. 2, the light source 1 comprises an enclosing box or structure 9 of a suitable sheet material such as steel or aluminum and having a removable or hinged lid 10 for easily obtaining access thereinto. The lid 10 has suitable anchors 11 fixed thereto and terminating in eyelets 12 engaging the chains 2 for supporting the light source 1 in a suspended condition. The lid 10 is secured to the balance of the box or structure 9 by means of suitable screws 13.

The box or structure 9 is enclosed except for an opening 14 formed in the center of a downwardly facing wall 15 thereof. A pocket member 16 is secured to the downwardly facing wall 15 by suitable means such as spot welding on a flange 17 abutting against the downwardly facing wall 15. The pocket member 16 has an opening 18 approximately the same size as the opening 14 and is aligned therewith. A bottom wall 19 of the pocket member 16 and containing the opening 18 is located spaced from the downwardly facing wall 15 forming a receiving pocket 20 therebetween. The pocket 20 is open at one end 21 for receiving one or more light filters 22 and 23 for a reason described hereinafter.

Contained within the box or structure 9 is a "black light" or ultraviolet lamp 24, the special characteristics of which are described hereinafter. The lamp 24 consists of an elongated tube 25 having terminal portions 26 at opposite ends thereof engaged in suitable mounting and electrical contacting brackets 27. The mounting brackets 27 are maintained in place in the box or structure 9 by suitable screws 28 extending through the downwardly facing wall 15. Insulated electrical wires 29 communicate with the brackets 27 for carrying electrical power to the ultraviolet lamp 24.

A conventional transformer or ballast 30 is suitably mounted within the box or structure 9 and is electrically connected in a conventional manner to the insulated wires 29. Electrical power enters the ballast 30 through suitable electrical lead-in wires 31 which also connect by conventional circuitry (not shown) to a toggle switch 32 and a pilot light 33. It is to be understood that the toggle switch 32 controls the power input to the ballast 30 which in turn causes the energization of the ultraviolet lamp 24.

Power directed to the ballast 30 is monitored by the pilot light 33.

An elongated parabolic reflector 34 is mounted by means of suitable screws 35 within the box or structure 9 and is located above and laterally with respect to the ultraviolet lamp 24 whereby a large portion of the output of the lamp which strikes the inside surface of the reflector is directed out through the opening 14.

Figures 3, 4, 5:
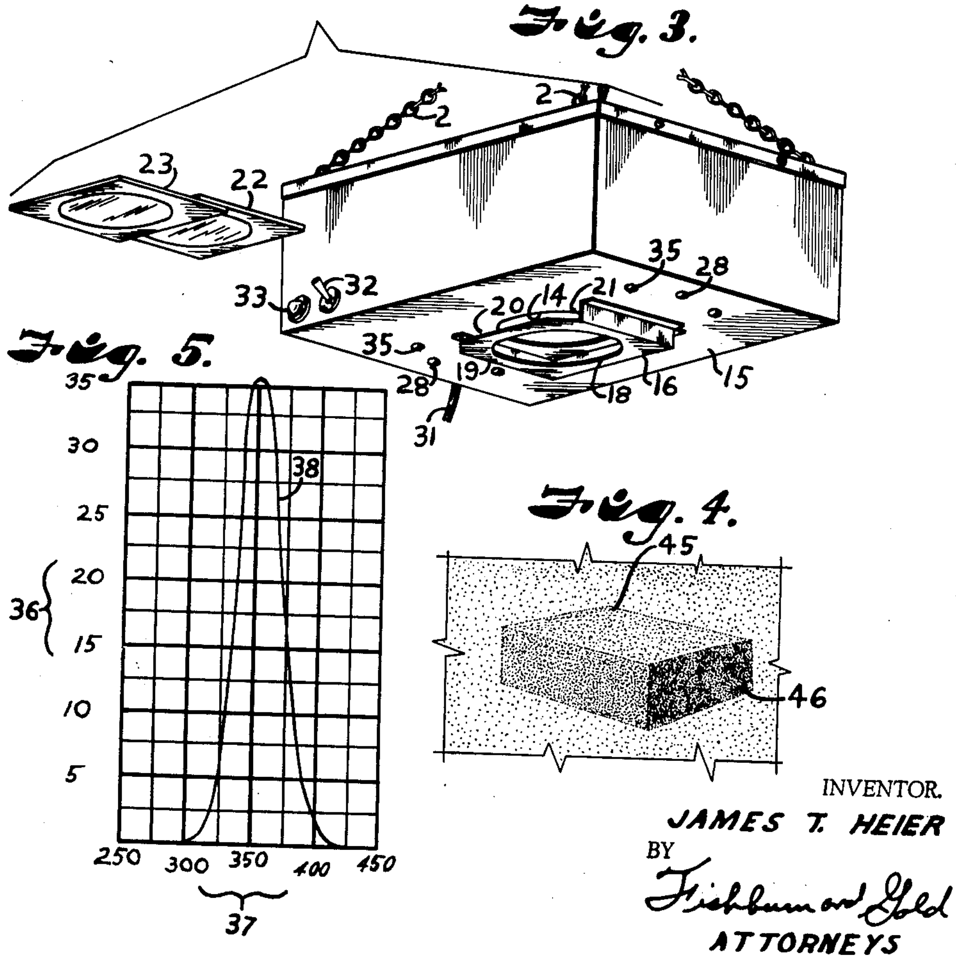
FIG. 3 is a perspective view of the light source illustrating the selective use of filters therewith.
FIG. 4 is a fragmentary schematic view illustrating half-tone dots forming a figure.
FIG. 5 is a graph with a line plotted thereon indicating the wave length intensity output distribution of an ultraviolet lamp used in connection with this invention.

The untraviolet lamp 24 is of the type commonly known as a "BLB" fluorescent lamp (General Electric Company) having a light output wave length distribution as illustrated in the graph of FIG. 5 wherein the vertical scale 36 is radiant power in milliwatts per one hundred angstroms per watt input and the horizontal scale 37 is wave length in millimicrons. In the illustrated example, the ultraviolet lamp 24 is of relatively low power, that is, it has only a six watt input. It is to be understood that the wave length output distribution of the ultraviolet lamp 24 is in the near ultraviolet range, that is, not so short as to cause eye damage to a person constantly exposed thereto, however, it is primarily within the range commonly known as ultraviolet, that is roughly between 200 and 390 millimicrons as indicated by the graph line 38. Specifically, the lamp 24 has a light output substantially confined between 315 and 400 millimicrons and peaking at about 35 milliwatts of radiant power per one hundred angstroms per watt input at about 350 millimicrons.

Although the narrow ultraviolet wave length range of the ultraviolet lamp 24 used in the manner described below offers improved contact printing results on orthochromatic lithographic emulsion film, it has been found that certain alterations of the ultraviolet lamp output by means of certain light filters provide greater control and finer results than the use of the ultraviolet lamp alone. The filter 22 which is insertable alone or with other filter or filters in the pocket 20 is preferably of the type manufactured by the Eastman Kodak Company and sold under the trade designation "Kodak Wratten Fliter Type 30." The filter 22 has a rose-colored tint to the eye and may be more specifically defined by reference to its transmittance curve illustrated by the graph of FIG. 6 wherein relative density and percentage transmittance make up the vertical scale 29 and wave length in millimicrons makes up the horizontal scale 40, that is, about 1% transmittance occurs at 300 millimicrons and 50% transmittance occurs at 390 to 440 millimicrons and 1% transmittance occurs at 490 millimicrons. A filter which produces results similar to the Type 30 is the "Kodak Wratten Type 81 Ef" (transmittance not shown).

Figures 7, 8:
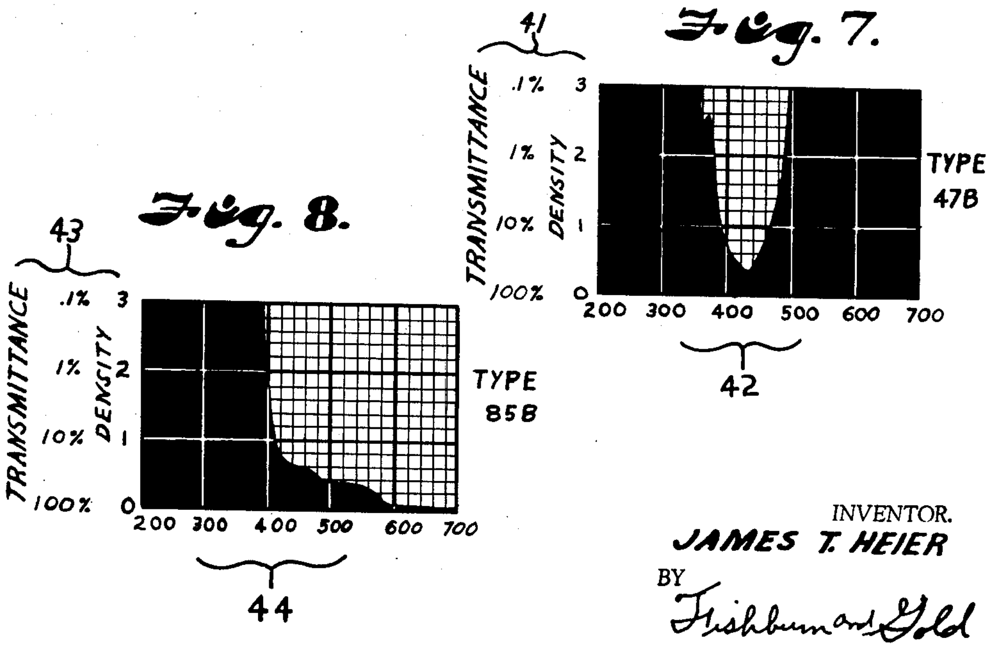

The filter 23 in the illustrated example is also of the type manufactured by the Eastman Kodak Company and is sold under the trade designation "Kodak Wratten Type 47B." The 47B filter is more specifically defined by its transmittance curve as illustrated by the graph of FIG. 7 wherein transmittance and relative density make up the vertical scale 41 and wave length in millimicrons makes up the horizontal scale 42, that is, about .3% transmittance occurs at 360 millimicrons and 40% transmittance occurs at 430 millimicrons and 1% transmittance occurs at 490 millimicrons. A filter (not shown) which also has been found of value in modifying the output of the ultraviolet lamp 24 is commonly known as the "Kodak Wratten Type 85B," and the transmittance curve thereof is illustrated by the graph of FIG. 8 wherein transmittance and relative density make up the vertical scale 43 and wave length in millimicrons makes up the horizontal scale 44, that is, about 1% transmittance occurs at 400 millimicrons and 10% transmittance occurs at 410 millimicrons and 40% transmittance occurs at 500 millimicrons. The mechanism by which the light output of the ultraviolet lamp 24 is altered by the respective filters and utilized in the light sensitive emulsion is not well understood, however, it is believed that the respective filters help narrow the wave length band output to partially eliminate wave lengths which would otherwise tend to scatter or diffuse among the silver halides in the photographic emulsions. It is to be noted that all the light which strikes the light sensitive emulsion must not only pass through the filter placed in the path thereof but also the polyester base sheet which usually carries the positive or negative transparency image being transferred to the emulsion. The above noted filters are described in the standard reference publication, "Filters For Scientific and Technical Use, Kodak Wratten," 21st edition, by Eastman Kodak Company, Rochester, New York.

In operation, the light source 1 is preferably suspended above the vacuum frame and spaced therefrom in the range of from three to four feet. The lead-in wire 31 is connected to any suitable interval timer (not shown) which is adapted to accurately control the time during which the lamp 24 is maintained actuated during an exposure. If high quality reproduction of lithographic half-tone dot structure of highlights such as 45 (FIG. 4) and shadows 46 are required with relatively high production speed, the filter 22 (Type 30) is inserted in the pocket 20 and an exposure of 3 to 6 seconds is obtained using any average speed orthochromatic lithographic film. If it is desired to increase the exposure time to allow time for mechanical blocking of a portion of the image or some other operation, a neutral density filter (for example, Wratten Type 96) may also be inserted in the pocket 20 which operates merely to cut down the intensity of light radiating from the light source 1 without significantly altering the wave length composition thereof. By slightly altering exposure time and/or film developing time, duplication of the negative or positive image may be obtained with a desired alteration of picture densities without changes in relative contrast or the sacrificing of detail. The above apparatus and procedure is also highly desirable in reproducing even large screen tints for color printing.

The Type 30 filter and an exposure of approximately seven seconds without a neutral density filter is highly desirable for producing the spreading of half-tone or line negatives or positives. Prior to exposure, a matte acetate sheet or smooth surfaced separator sheet is placed (matte surface up) over the emulsion, and the negative or positive is placed emulsion side up on top of the matte or smooth surface separator sheet. For different degrees of spread, matte or separator sheets of various thicknesses may be used, for example, .004 to .020 inch in thickness. High predictability and control are obtained.

The light source 1 and Type 30 filter used in the manner noted for making exact reproductions, with slightly higher exposure times, tends to eliminate any fuzzy or "soft" edges of half-tone dots forming the image on a positive or negative, thus producing sharper half-tone dots and, therefore, a higher quality image on the emulsion to which it is transferred.

There are many instances when a positive or negative has an area of "ghost" dots caused, for example, by under-exposure or under-developing, which ghost dots are often lost in transfer and require a remake of the original camera positive or negative. By using the light source 1 with a filter of the Type 47B, placing the emulsion of the positive or negative against the light sensitive emulsion and exposing 30 to 40 seconds, it has been found that dots which would ordinarily be lost are clearly and sharply reproduced on the emulsion. If longer exposure times are desired, for example 5 minutes, the Type 85B filter may be used to obtain similar results. This ability to reproduce dots or lines sharply and clearly permits the production of extreme background densities (in the order of 4.80) when required. Also, due to the ability of this invention to produce extremely "hard" dots, plates may be etched down much further than heretofore. For example, 50 percent connected half-tone dots can be etched down to 10 percent dots and yet hold proper density.

Persons skilled in the art of lithographic contact printing will find little difficulty in applying the above described invention to other problems in this field with advantage. The use of this invention has been found to result in higher quality over-all production, fewer rejects which require expensive remakes, the opportunity to use lesser skilled and thus lower paid personnel, and the elimination of much elaborate equipment which would otherwise be necessary to obtain the desired control.

It is to be understood that while certain forms of this invention have been illustrated and described, it is not to be limited to the specific examples or arrangement of parts herein described and shown except insofar as such limitations are included in the claims.

What I claim and desire to secure by Letters Patent is:

1. A photoprinting combination for transferring half-tone structure from one transparency to another for improving the structure prior to making printing plates therefrom comprising:

(a) a photographic transparency having a lithographic half-tone structure, (b) a transparent film having a light sensitive orthochromatic silver halide photographic emulsion thereon underlying said transparency, (c) a fluorescent type light source in the order of 6 watts and located about 3 feet from said transparency and being adapted to emit light energy toward said transparency substantially competely within a band range of about 315 to 400 millimicrons in wave length and peaking at about 35 milliwatts of radiant power per one hundred angstroms per watt input at about 350 millimicrons, and (d) a light filter located between said transparency and said light source and having light transmission characteristics for narrowing the wave length band output of said light source, (e) whereby said half-tone structure is clearly reproduced on said film.

2. The combination as set forth in claim 1 wherein said filter has a transmittance curve substantially wherein 1% transmittance occurs at 300 millimicrons and 50% transmittance occurs at 390 to 400 millimicrons and 1% transmittance occurs at 490 millimicrons.

3. The combination as set forth in claim 1 wherein said filter has a transmittance curve substantially wherein .3% transmittance occurs at 360 millimicrons and 40% transmittance occurs at 430 millimicrons and 1% transmittance occurs at 490 millimicrons.

4. The combination as set forth in claim 1 wherein said filter has a transmittance curve substantially wherein 1% transmittance occurs at 400 millimicrons and 10% transmittance occurs at 410 millimicrons and 40% transmittance occurs at 500 millimicrons.

References Cited by the Examiner

UNITED STATES PATENTS 2,569,793 10/51 Anderson ---------------- 95—73

EVON C. BLUNK, *Primary Examiner.*